United States Patent [19]

Siciliano et al.

[11] 4,195,594

[45] Apr. 1, 1980

[54] FEEDING SYSTEM FOR ANIMALS

[75] Inventors: Anthony J. Siciliano, South Lyon; Serge Artamonoff, Northville, both of Mich.

[73] Assignee: Diamond International Corporation, New York, N.Y.

[21] Appl. No.: 872,055

[22] Filed: Jan. 25, 1978

[51] Int. Cl.² ............................................... A01K 5/02
[52] U.S. Cl. ................................................. 119/52 B
[58] Field of Search .............. 119/52 AF, 52 B, 56 R, 119/18; 214/17 CA; 198/524, 855, 857, 631, 671

[56] References Cited

U.S. PATENT DOCUMENTS

| | | | |
|---|---|---|---|
| 3,164,128 | 1/1965 | Arledge | 119/52 B X |
| 3,273,539 | 9/1966 | Cooper | 119/52 B |
| 3,774,785 | 11/1973 | Gasseling | 214/17 CA |

*Primary Examiner*—Hugh R. Chamblee
*Attorney, Agent, or Firm*—Kenyon & Kenyon

[57] ABSTRACT

In a feed supply system in which feed from a hopper is directed into down spouts by means of augers, agitators, gravity feed or the like, the down spouts terminating at a feed trough, a sensor capable of sensing a build up of feed is disposed at the end of the down spout and supplies a signal to terminate dispensing when excess feed is sensed.

26 Claims, 6 Drawing Figures

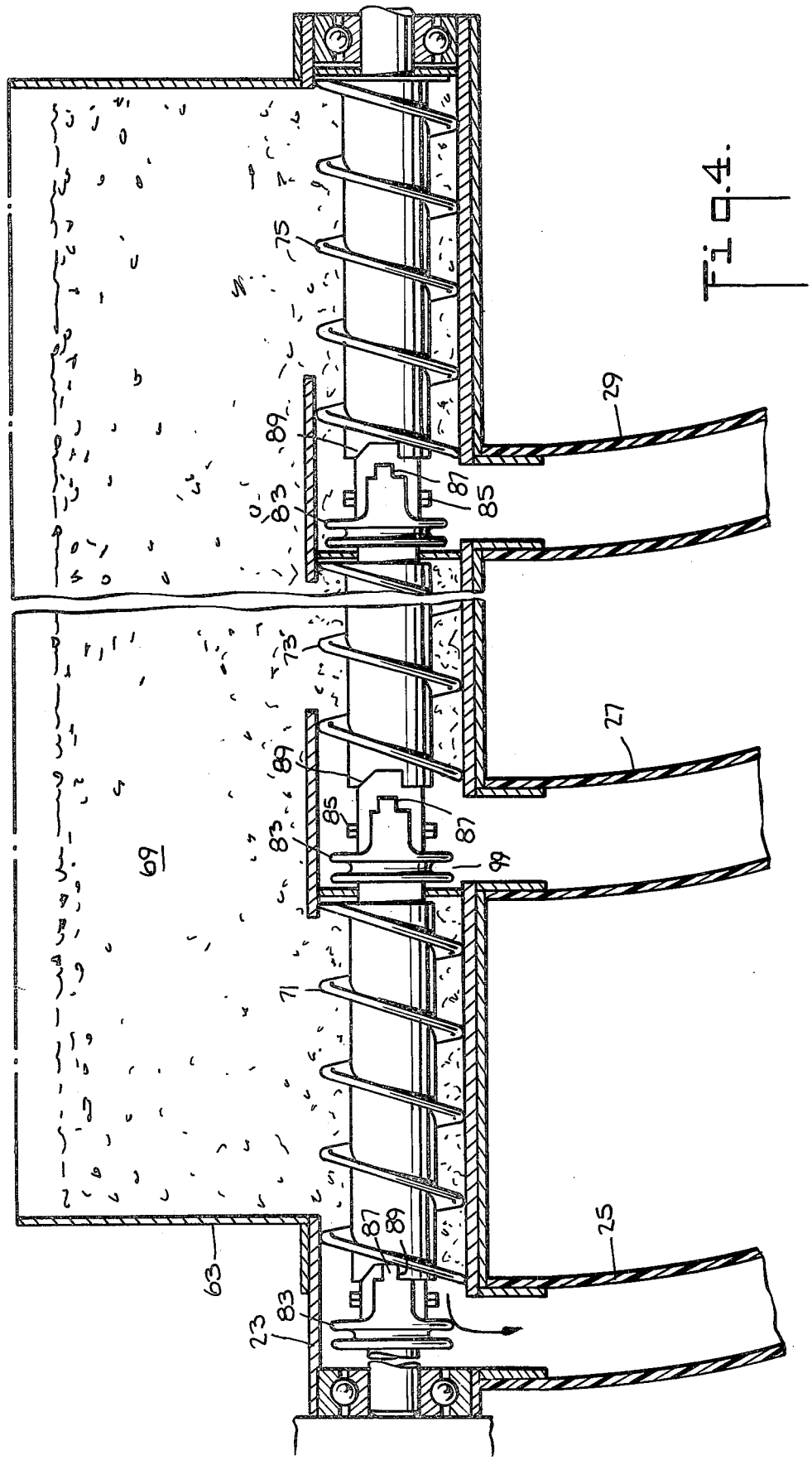

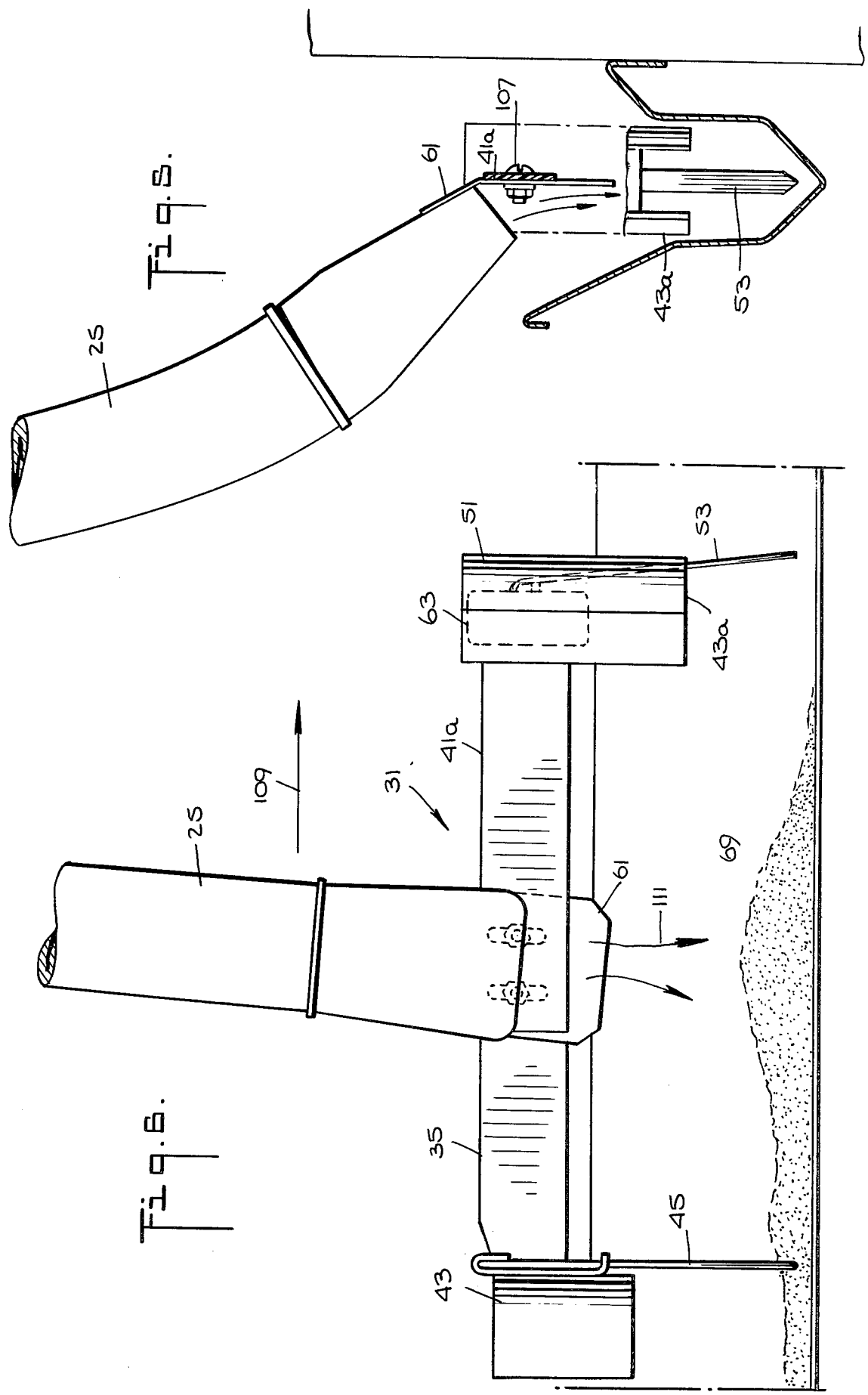

FEEDING SYSTEM FOR ANIMALS

BACKGROUND OF THE INVENTION

This invention relates in general to feed dispensing of the type adapted to feed animals such as poultry confined in cages or the like, and more particularly, to an improved feed dispensing system which is capable of regulating the amount of feed supplied to a feed trough.

U.S. Pat. No. 4,030,452, granted to Keen and Siciliano, discloses a feed dispensing hopper which is adapted for travel above a battery of poultry cages arranged in tiers for dispensing feed thereto through individual funnels or down spouts directed to troughs in front of the cages at a location where the trough is available to the chicken. An auger assembly for use in such a dispensing hopper is described in U.S. application Ser. No. 777,743 filed Mar. 14, 1977. The system is further described in U.S. Pat. No. 4,019,461 issued Apr. 26, 1977. In that system, the feed hopper is disposed above a plurality of augers mounted on a common shaft. The augers route the feed from the hopper into individual down spouts which terminate above feed troughs disposed in front of the poultry. The system is adapted to continuously supply feed to the troughs as the hopper is moved over the length of the battery of cages in one direction. Thus, this system is one in which all troughs and all areas of each trough are supplied with a predetermined amount of feed.

Due to many variables, such as different ages or breeding of stock, and variation in temperature of air velocities within a cage house, uneven consumption of feed will sometimes occur and cause portions of the feed trough to retain feed between feeding schedules. During a subsequent feeding, the supply of additional feed thereto will cause areas of feed to accumulate, this, of course, can result in feed waste or over feeding. The invention disclosed herein has been found to regulate the feed supply and eliminate waste and overfeeding.

SUMMARY OF THE INVENTION

Briefly stated, in a feed supply system of the general nature described above a regulatory means is provided to govern the quantity of feed being supplied. In this system, feed from a hopper is directed into down spouts which terminate at a feed trough. Regulation is accomplished by providing a sensor capable of sensing a build up of feed in the trough and by providing means responsive to the feed sensor for terminating dispensing when excess feed in the trough is sensed. In the illustrated embodiment, control of dispensing is accomplished by solenoid operated clutches associated with the augers, the clutches being responsive to the sensor at the trough to alternately connect or disconnect the auger as required. Each down spout and thus each feed trough is provided with a separate auger which can be controlled in this manner. Thus, an oversupply of feed never takes place and feed usage is minimized. In accordance with the illustrated embodiment, the feed sensor is disposed ahead of the down spout in the direction of feeding and a feed stirring and smoothing means is disposed behind the down spout; both the sensor and the stirring and smoothing means being attached to the end of the down spout.

BRIEF DESCRIPTION OF THE DRAWINGS

FIG. 4 is a view similar to that of FIG. 3 showing the feed trough and the manner in which the augers act to supply feed to the down spouts;

FIG. 5 is an elevation view, partially in cross section, depicting the end of a down spout and the feed sensor; and FIG. 6 is a front elevation view of the arrangement of FIG. 5 illustrating the feed sensor and the stirring and smoothing action in the present invention.

DETAILED DESCRIPTION OF THE PREFERRED EMBODIMENT

Figure 1:
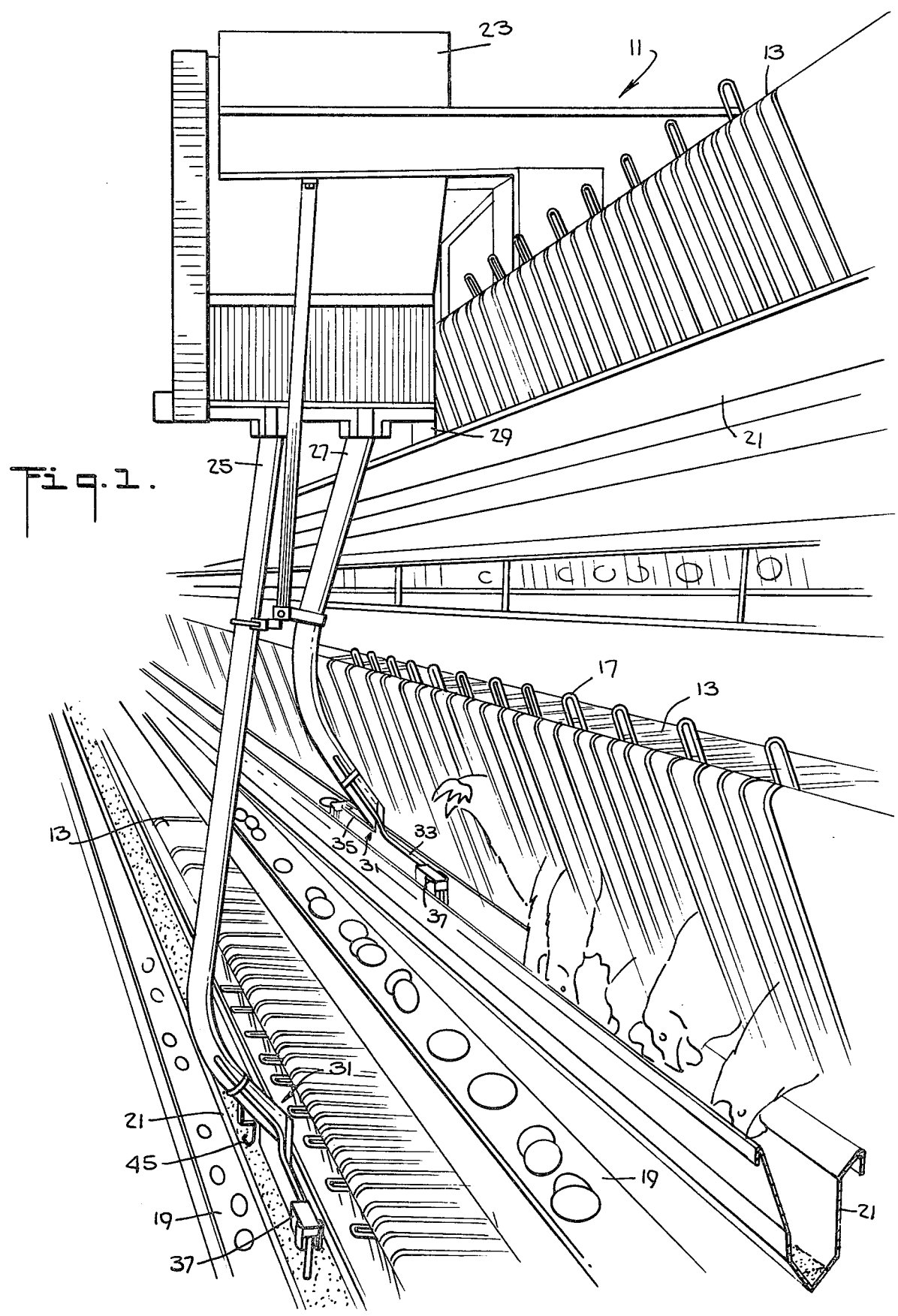
FIG. 1 is a perspective view of a feed system illustrating the feed sensing system of the present invention.

FIG. 1 depicts a cage system or egg laying battery of a type commonly in use at poultry farms. The battery indicated generally as 11 includes three tiers of cages 13. Each tier is individually divided into individual cages so that individual chickens 15, for example, can be placed in each cage, there being a door, having the upper portion 17 associated with each individual cage in the cage tiers 13. The cages are constructed so that eggs layed by the chickens 15 roll onto a conveyor belt 19 and are conveyed away. Disposed in front of each tier of cages 13 is a feed trough 21.

It is conventional practice to feed the chickens at fixed periods. The tiers of cages 13 each extend over a long distance which in some cases may reach 600 feet or more. In order to supply feed to the troughs, a feed system including a hopper 23 having extending therefrom down spouts 25, 27 and 29 is provided. The down spout 25 terminates at the lowermost feed trough 21, the down spout 27 at the middle feed trough 21 and the down spout 29 at the uppermost feed trough 21. Feed is driven from the hopper 23 into the down spouts by means of an auger assembly which is described in greater detail below. The portion of the system thus far described corresponds to those of the aforementioned patents and applications.

In accordance with the present invention, there is attached to the end of each down spout 25, 27 and 29, a feed sensing assembly indicated generally as 31. This assembly includes two arms 33 and 35 extending from opposite sides of the down spout in the direction of the feed troughs 21. On the end of the arm 35, is a stirring and smoothing means in the form of a wire 45. On the end of the arm 33, is a feed sensor 37. As will be seen in more detail below, the sensor 37 includes a microswitch and thus, there is an electrical line 39 leading therefrom.

Figure 2:
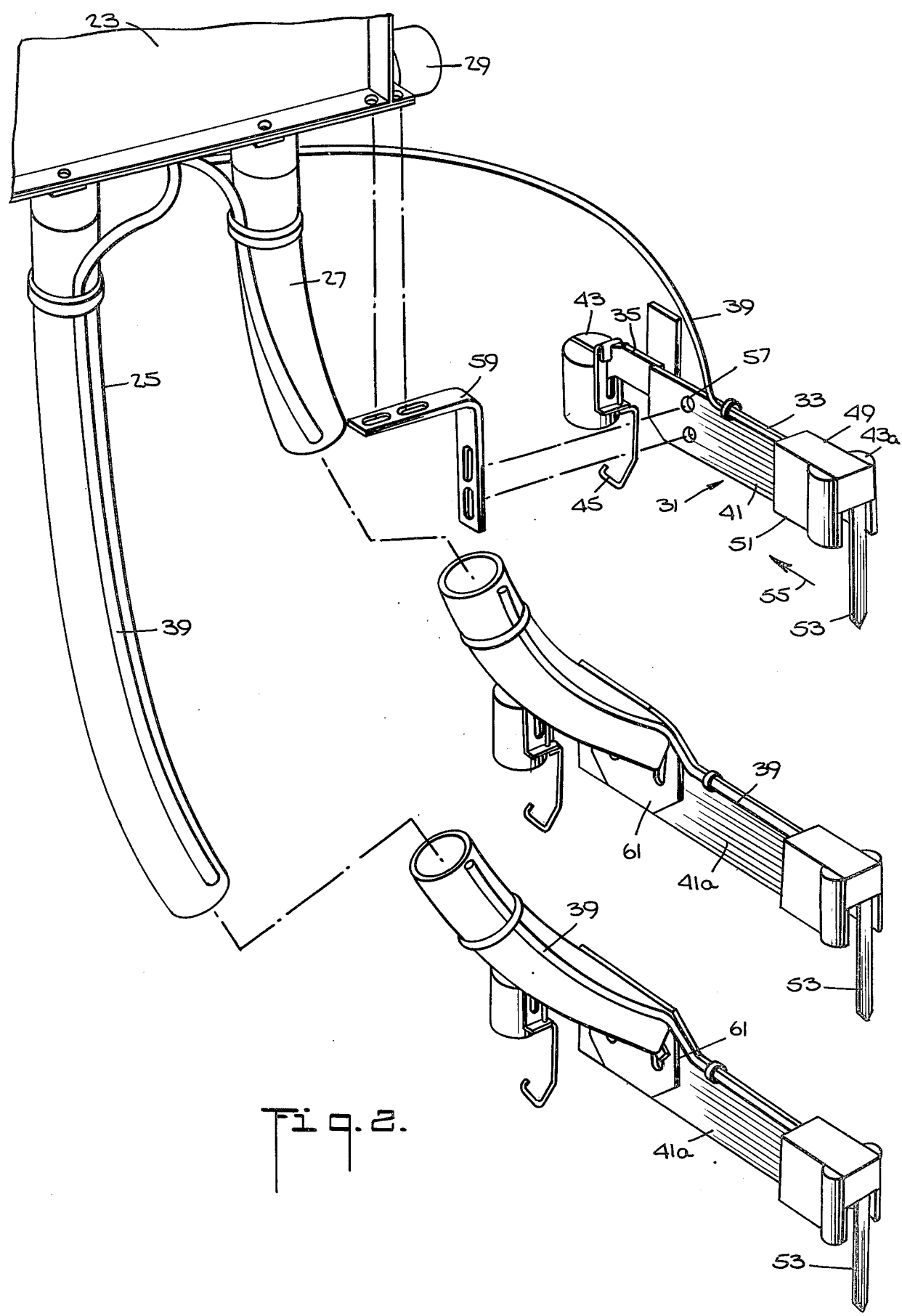
FIG. 2 is a perspective view, partially exploded and cut away, showing the respective feed sensors and feed spreaders for each of the three feed troughs in a battery of cages.

This construction is shown in more detail in FIG. 2. Extending downwardly from the hopper 23 are the down spouts 25, 27 and 29. As indicated, feed sensing assembly 31 includes a member 41 which forms the arms 33 and 35. On the end of the arm 35 is a guide 43 and depending downward therefrom, a wire 45 forming an open loop with a V-shaped bottom matching the contour of the feed trough 21 of FIG. 1. The wire is retained within a bracket 47 attached to the guide 43 via a slot. The slot permits upward and downward movement of the V-shaped loop 45 thus preventing the loop from becoming entangled with the trough joints. The V-shaped loop 45 functions to keep the feed stirred and eliminate crusting or moldy feed to accumulate. Also, at the same time the loop 45 serves to smooth the feed to a certain degree. Guide 43 and the forward guide 43a serve to keep the feed sensing assembly aligned within the trough during travel.

On the other end of the member 41, i.e, on the arm 33, is a microswitch assembly 49 which includes a cover 51, a microswitch and a flexible sensing member 53 depending downward from the microswitch and adapted to close the microswitch when pushed in the direction of arrow 55. The member 41 contains a pair of holes 57 which permit attaching it to the hopper assembly 23 by means of an angle bracket 59. The lower members designated 41a attach to the ends of the respective down spouts 25 and 27 by means of brackets 61. The exact manner of attachment is described more fully in connection with FIGS. 5 and 6.

Figure 3:
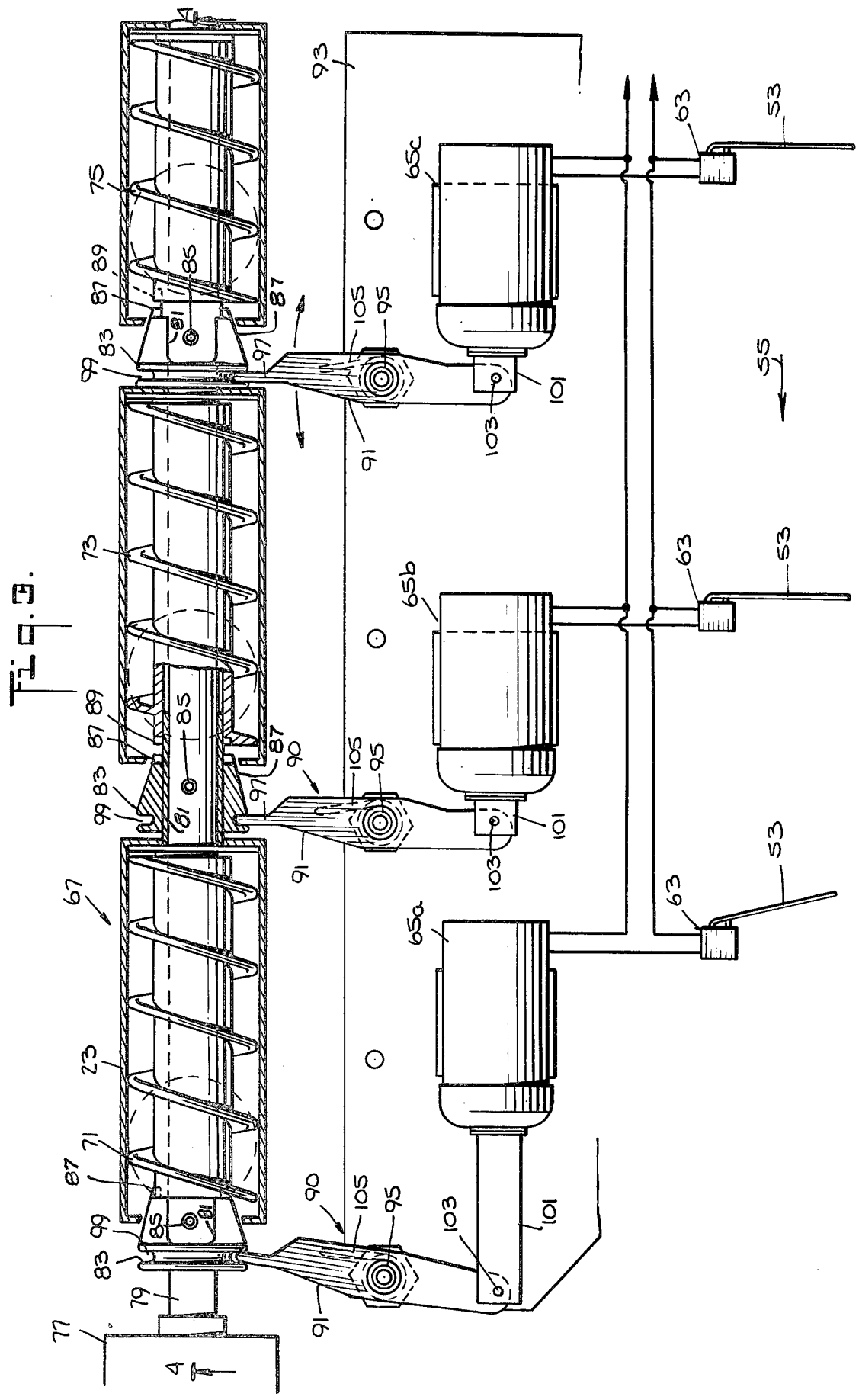
FIG. 3 is a plan view, partially in cross section and partially in schematic form, illustrating the operation of the auger clutches.

FIG. 3 illustrates the manner in which the feed into the down spouts 25, 27 and 29 is controlled by means of the sensing members 53. As illustrated in FIG. 3, each sensing member 53 is supported for rotation so that when a force in the direction of arrow 55 is applied to its end, it will close a microswitch 63. Each microswitch controls a solenoid 65a, 65b and 65c. In accordance with the present invention, rather than using augers which are constantly driven during feeding, each of the augers is coupled to a driving shaft by means of a clutch. FIG. 3 is a plan view looking down from the hopper onto the auger mechanism which is indicated generally as 67. FIG. 4, which is a cross sectional view through FIG. 3, also shows the hopper 63 and the down spouts 25, 27 and 29. Feed 69 is fed to augers 71, 73 and 75 from above. If the auger is rotating, it drives the feed into its respective down spout. Thus, the auger 71 is shown as operating and driving feed into the down spout 25. Drive means 77 such as an electric motor is used to drive a shaft 79. The shaft 79 passes through each of the augers 71, 73 and 75 and is journaled in the hopper casing 23, the shaft 79 extending therefrom on the right hand end. Also mounted to the shaft are clutch members 83 which are driven with the shaft 79 by means of pins 85 inserted through the shaft 79. Upon rotation, pin 85 rotates and engages clutch surface 81 and causes the clutch to rotate along with shaft 79. In FIGS. 3 and 4, the clutches 83 for augers 73 and 75 are shown in their retracted position so that shaft 79 is not coupled to them. The clutches 83 contain on their ends two opposed projections 87 adapted to engage slots 89 on the ends of the augers 71, 73 and 75. See the clutch for auger 71 which is drawn in the operational position with projections 87 engaging the auger slots 89. The clutches 83 are coupled to the solenoids by means of linkages 90. These linkages include an arm 91 which is attached to a plate 93 by means of a pivot assembly 95. The arm 91 has a tip 97 at one end thereof which engages the annular slot 99 in the clutch 83. The other end of arm 91 is pinned to the solenoid rod 101 by means of a pin 103. The two solenoids 65b and 65c are shown in their retracted, actuated position. The solenoid rods 101 are normally held in an unactuated position by means of springs 105 disposed between the arms 91 and the plate 93 which tend to rotate the arms 91 in a clockwise direction to retract the solenoid rods 101 to cause the clutches 83 to engage and the augers 71, 73 and 75 to supply feed. If one of the switches such as the two switches 63 associated with solenoids 65b and 65c are operated, the solenoids operate to draw rod 101 in, acting against the spring force of the spring 105, to disengage its associated clutch 83.

FIGS. 5 and 6 show respectively a cross sectional side elevation view and a cross sectional front elevation view of the end of a feed spout 25, for example, showing the attachment of the feed sensing assembly 31 thereon. As illustrated, the bracket 61 on the end of the spout 25 is used as a means of attaching the member 41a thereto. This is accomplished with the conventional nut and bolt arrangement 107. Also shown on this figure again is the guide 43 at the end of the arm portion 35 and the wire loop 45. The microswitch 63 is illustrated in dotted lines within the cover 51 with the sensing member 53 extending therefrom. As illustrated, the bracket 61 is slotted thereby permitting adjustment of the member 41 so that the wire member 45 and the sensor 53 can be properly positioned.

In operation, the feed assembly 11 which is supported for movement along the length of the battery in the manner described in the aforementioned patents and applications, is moved in a direction away from the viewer as seen in FIG. 1. During this movement, a certain amount of stirring and smoothing of any remaining feed will take place by means of the wire loop 45 (see FIG. 6). Once at the far end of the battery, the feeding operation is commenced. When there is insufficient feed in the troughs, sensor 53 is pushed to close the microswitch 63, as the system 11 moves in the direction of arrow 109 shown on FIG. 6, i.e., in a direction towards the observer as seen from FIG. 1. Microswitches 63 remain open and springs 105 bias the respective clutches 83 to the engaging position so that augers 71, 73 and 75 are feeding feed to their respective troughs 21. If sensor 53 encounters a predetermined amount of feed such as the pile of feed 69 shown in FIG. 6, the switch will be closed operating the respective solenoid 65 to disengage the associated clutch 83 to stop the auger associated therewith from turning and thus stop supplying feed to that particular trough.

When the auger rotation stops, there remains feed in the down spout. By positioning the sensors to lead the down spout, this remaining feed is deposited ahead of the accumulated feed. Thus, the forward positioning of the sensor accounts for the lag within the feeding system. The auger will remain disengaged as long as the sensor 53 is running through feed finding resistance. It should be noted, that the height of the sensor 53 above the bottom of the feed trough 21 is adjusted so as to provide the desired level of feed therein. The wire member 45 following behind the down spout 25, stirs and smoothes out the feed thus tending to equalize the amount of feed whether it be feed remaining or feed just deposited from the down spout 25 and indicated by the arrows 111. Thus, by the time the system 11 reaches the end of the battery, moving in the direction of arrow 109, a constant level of feed which is sufficient for a feeding of the poultry in the cages, remains in the troughs 21 without accumulation of feed. Accordingly, the minimum required amount of feed is always supplied to each of the troughs and excess or accumulated feed is eliminated.

Although the above description is directed to a preferred embodiment of the invention, it is noted that other variations and modifications will be apparent to those skilled in the art and, therefore, may be made without departing from the spirit and scope of the present disclosure.

What is claimed is:

1. In an animal feeding apparatus in which feed is supplied to an elongated feed trough by means of a hopper disposed thereabove having extending therefrom a down spout terminating adjacent the feed trough, the hopper and down spout being adapted for movement along the length of the trough such that feed being supplied from the feed hopper is transferred to said feed trough via said down spout, the improvement comprising means disposed at the end of said down spout and ahead of said down spout with reference to the direction of travel thereof during feeding for sensing an accumulation of feed in the trough and means responsive thereto for causing said flow from said feed hopper to terminate operation for as long as said sensing means sense the presence of an accumulation of feed in said trough ahead of said down spout.

2. The improvement according to claim 1 which further includes in association with said feed hopper a supply means comprising an auger mechanism, means for driving said auger mechanism, and stopping means for causing said auger mechanism to stop feeding which comprises a clutch responsive to said sensing means interposed between said driving means and said auger mechanism.

3. The improvement according to claim 1 wherein said sensing means comprises a microswitch having a sensing member depending downward therefrom into said feed trough and operable to close said switch when a predetermined amount of feed is encountered.

4. The improvement according to claim 3, wherein said microswitch is disposed on an arm extending ahead of said down spout in the direction of travel during feeding whereby a build up of feed will be sensed before the feed spout reaches that point and sufficient delay time exists so that feed remaining in the spout after stopping said supply means will not over supply said trough.

5. The improvement according to claim 1 and further including feed stirring means disposed at said feed spout.

6. The improvement according to claim 5 wherein said feed stirring means are disposed so as to be behind said feed spout with reference to the direction of travel thereof during feeding.

7. The improvement according to claim 6 wherein said feed stirring means comprise a guide on the end of said arm and a contoured wired loop having the bottom end thereof substantially matching the shape of said feed trough.

8. In an animal feeding apparatus in which feed is supplied to an elongated feed trough by means of a hopper disposed thereabove having extending therefrom a down spout terminating adjacent the feed trough, the hopper and down spout being adapted for movement along the length of the trough such that feed being supplied from the feed hopper is transferred to said feed trough via said down spout, the improvement comprising means disposed at the end of said down spout for sensing an accumulation of feed in the trough, means responsive thereto for causing said flow from said feed hopper to terminate operation for as long as said sensing means sense the presence of an accumulation of feed in said trough, and supply means in association with said feed hopper including an auger mechanism, means for driving said auger mechanism, and stopping means for causing said auger mechanism to stop feeding which includes a clutch responsive to said sensing means interposed between said driving means and said auger mechanism.

9. The improvement according to claim 8 wherein a plurality of feed troughs are provided, each supplied from a separate down spout, and wherein a separate auger and separate clutch are provided for each down spout.

10. The improvement according to claim 8 wherein said driving means comprise a driven shaft, said augers being disposed so as to be free to rotate on said shaft within a housing and wherein said clutches comprise: generally cylindrical members also supported on said shaft and pinned thereto, said cylindrical members containing slots therein permitting movement in the longitudinal direction of said shaft, between two stops; cooperating projections and recesses on said cylindrical members and augers for permitting engagement and disengagement, said stops being selected so that at one stop said cooperating projections and recesses are in engagement and at the other stop, are not in engagement; and means for moving said cylindrical members between said two stops in response to said sensing means.

11. The improvement according to claim 10 wherein said means for moving said cylindrical members comprise:
 (a) a solenoid responsive to said sensing means;
 (b) an annular recess on said cylindrical member;
 (c) a lever arm pivoted about a fixed point having on end engaging in said annular recess and another end coupled to said solenoid; and
 (d) means biasing said lever arm so as to cause said cylindrical member to engage its auger whereby operation of said solenoid will act against said biasing member to disengage said cylindrical member from said auger to stop feeding.

12. The improvement according to claim 10 wherein said sensing means comprise a microswitch having a sensing member depending downward therefrom into the feed trough and operable to close said switch when a predetermined amount of feed is encountered, said microswitch being electrically coupled to said solenoid.

13. The improvement according to claim 12 wherein said feeding system is associated with a battery of poultry cages.

14. The improvement according to claim 13 wherein said poultry cages comprise a three tier arrangement and wherein three augers are provided all disposed on a common shaft, each having associated therewith a cylindrical member, a solenoid, means for moving, and a microswitch and sensing member.

15. In a method for feeding animals in which feed is supplied to an elongated feed trough by means of a hopper disposed thereabove having extending therefrom a down spout terminating adjacent the feeding trough, the hopper and down spout being moved along the length of the trough and feed being supplied to the feed trough by supply means transferring feed from the feed trough to the down spout, the improvement comprising sensing an acumulation of feed in the trough at a location ahead of the feed spout with reference to the direction of movement thereof during feeding and terminating operation of the supply means for as long as the presence of an accumulation of feed in said trough is sensed at the location, whereby a build-up of feed will be sensed before the feed spout reaches the location ahead of the feed spout and sufficient delay time will exist so that feed remaining in the spout after terminating said supply means will not oversupply said trough.

16. The improvement according to claim 15 wherein a plurality of feed troughs are provided in association with a battery of poultry cages, each supplied from a separate down spout, and wherein said steps of sensing and terminating are carried out individually for each trough.

17. The improvement according to claim 15 and further including the step of stirring and smoothing the feed level in said trough as said down spout is moved.

18. The improvement according to claim 17 wherein said stirring and smoothing is carried out at a point spaced from the feed spout so as to be behind said feed spout during feeding.

19. In a poultry feeding apparatus in which feed is supplied to an elongated feed trough by means of a hopper disposed thereabove having extending therefrom a down spout terminating adjacent the feed trough, the hopper and down spout being adapted for movement along the length of the trough and feed being supplied to the feed trough by an auger and means driving said auger for positively transferring feed from the feed trough to the down spout at a controlled rate, the improvement comprising:
 (a) a microswitch disposed at the end of the down spout for sensing an accumulation of feed in the trough having a sensing member depending downward therefrom into the feed trough operable to close said switch when a predetermined amount of feed is encountered; and
 (b) a clutch responsive to said sensing means interposed between said driving means and said auger mechanism for causing said auger to terminate operation for as long as said sensing means sense the presence of an accumulation of feed in said trough.

20. The improvement according to claim 19 wherein said microswitch is disposed on an arm extending in front of said down spout in the direction of travel during feeding whereby a build up of feed will be sensed before the feed spout reaches that point and sufficient delay time exists so that feed remaining in the spout after stopping said auger will not over supply said trough.

21. The improvement according to claim 20 and further including feed stirring and smoothing means disposed at said feed spout.

22. The improvement according to claim 21 wherein said feed stirring and smoothing means are disposed on an arm extending in a direction opposite the direction of movement during feeding.

23. The improvement according to claim 22 wherein said feed stirring and smoothing means comprise a guide on the end of said arm and a contoured wire loop having the lower end thereof substantially matching the shape of said feed trough.

24. The improvement according to claim 23 wherein said driving means comprise a driven shaft, said auger being disposed so as to be free to rotate on said shaft within a housing and wherein said clutch comprises a generally cylindrical member also supported on said shaft and pinned thereto, said cylindrical member containing a slot therein permitting movement in the longitudinal direction of said shaft between two stops, cooperating projection and recesses on said cylindrical member and auger for permitting engagement and disengagement, said stops being selected so that at one stop said cooperating projections and recesses are in engagement and at the other stop are not in engagement, and means for moving said cylindrical members between said two stops in response to said sensing means.

25. The improvement according to claim 24 wherein said means for moving comprise:
 (a) a solenoid responsive to said sensing means;
 (b) an annular recess on said cylindrical member;
 (c) a lever arm pivoted about a fixed point having one end engaging in said annular recess and other end coupled to said solenoid; and
 (d) means biasing said lever arm so as to cause said cylindrical member to engage its auger whereby operation of said solenoid will act against biasing member to disengage said cylindrical member from said auger to stop feeding.

26. In an animal feeding apparatus in which feed is supplied to an elongated feed trough by means of a hopper disposed thereabove having extending therefrom a down spout terminating adjacent the feed trough, the hopper and down spout being adapted for movement along the length of the trough such that feed being supplied from the feed hopper is transferred to said feed trough via said down spout, the improvement comprising means disposed at the end of said down spout for sensing an accumulation of feed in the trough, means responsive thereto for causing said flow from said feed hopper to terminate operation for as long as said sensing means sense the presense of an accumulation of feed in said trough, and feed stirring means disposed behind said feed spout with reference to the direction of travel thereof.

* * * * *

UNITED STATES PATENT AND TRADEMARK OFFICE
CERTIFICATE OF CORRECTION

PATENT NO. : 4,195,594
DATED : April 1, 1980
INVENTOR(S) : Anthony J. Siciliano & Serge Artamonoff It is certified that error appears in the above—identified patent and that said Letters Patent is hereby corrected as shown below:

Column 6, line 31 — change "on" to --one--

Column 6, line 62 — change "acumulation" to --accumulation-

Column 8, line 28 — change "other" to --another--

Signed and Sealed this

Twenty-second Day of July 1980

[SEAL]

Attest:

SIDNEY A. DIAMOND

Attesting Officer     Commissioner of Patents and Trademarks